United States Patent
Ford

(10) Patent No.: US 8,151,546 B2
(45) Date of Patent: Apr. 10, 2012

(54) HORSE BOOT CONNECTED TO GLUED-ON LINER

(75) Inventor: Garrett N. Ford, Tucson, AZ (US)

(73) Assignee: Easycare, Inc., Tucson, AZ (US)

( * ) Notice: Subject to any disclaimer, the term of this patent is extended or adjusted under 35 U.S.C. 154(b) by 268 days.

(21) Appl. No.: 12/571,182

(22) Filed: Sep. 30, 2009

(65) Prior Publication Data
US 2010/0083624 A1 Apr. 8, 2010

Related U.S. Application Data

(60) Provisional application No. 61/102,172, filed on Oct. 2, 2008.

(51) Int. Cl.
*B68C 5/00* (2006.01)
(52) U.S. Cl. ............................................. 54/82; 119/850
(58) Field of Classification Search ...... 54/82; 119/850; 168/1, 18, 23
See application file for complete search history.

(56) References Cited

U.S. PATENT DOCUMENTS

| | | | | |
|---|---|---|---|---|
| 104,369 A * | 6/1870 | Somerville | ........................ | 54/82 |
| 448,312 A * | 3/1891 | Barclay | ........................... | 168/18 |
| 756,792 A * | 4/1904 | Keller | ............................... | 54/82 |
| 4,819,731 A * | 4/1989 | Stubbe | .............................. | 168/4 |
| 4,892,150 A * | 1/1990 | Thoman | ............................ | 168/4 |
| 5,588,288 A | 12/1996 | Origgi et al. | | |
| 5,692,569 A | 12/1997 | Constantino et al. | | |
| 5,699,861 A * | 12/1997 | Sigafoos | ......................... | 168/17 |
| 5,983,611 A * | 11/1999 | Smahl et al. | ...................... | 54/82 |
| 6,122,901 A * | 9/2000 | Schultz et al. | .................... | 54/82 |
| 6,393,810 B1 * | 5/2002 | Mier | ................................. | 54/82 |
| 6,694,713 B1 | 2/2004 | MacDonald | | |
| 2006/0225670 A1 | 10/2006 | Faulk | | |
| 2006/0231045 A1 | 10/2006 | Lindley | | |
| 2009/0235621 A1 * | 9/2009 | Ford | ................................. | 54/82 |

* cited by examiner

*Primary Examiner* — Kristen C Hayes
(74) *Attorney, Agent, or Firm* — Antonio R. Durando

(57) ABSTRACT

A horse boot includes the combination of an inner liner (10 and 10') and an outer shell (12). The liner is adapted to wrap around the front and lateral surfaces of the hoof of the horse, while the shell includes an upper (16) designed to conform with the exterior surface of the liner for attachment to it. The shell is fastened to the liner by some detachable means, such as nuts (22) and bolts (20), and the liner/shell assembly is glued to the hoof. The shell may then be removed at will to allow the hoof to be barefoot and may be re-installed to produce a boot in place when desired.

16 Claims, 12 Drawing Sheets

HORSE BOOT CONNECTED TO GLUED-ON LINER

RELATED APPLICATIONS

This application is based on and claims the priority of provisional application Ser. No. 61/102,172 filed Oct. 2, 2008, hereby incorporated by reference.

BACKGROUND OF THE INVENTION

1. Field of the Invention

The invention relates in general to boots for horses and, in particular, to a boot held in place by bonding an anchoring liner to the exterior surface of the horse's hoof and then fastening the shell of the boot to the liner.

2. Description of the Prior Art

Horse boots are used to protect the hooves and fetlocks of horses and may be used in lieu of horseshoes. A horse boot typically consists of a shell that includes a sole with opposed flat, top and bottom, major surfaces and an upper that projects upward from the top surface of the sole and forms an enclosure for the hoof of the horse. The upper typically extends along the rim of the sole and has a bottom edge secured to the sole. The top edge of the upper is remote from the sole, either entirely or at least in the front of the shell, and is sometime connected to a cuff that can be tightened around the hoof and pastern of the horse.

In the typical arrangement, the upper and the cuff (if present) are spread open to put the boot on the hoof of the horse. After spreading open the upper and the cuff, the shell is slid over the hoof and the upper is tightened around the hoof to secure the boot in place. Several means for tightening the upper have been used in the art, such as laces, straps, and cables connected to a buckle or other tensioning devices mounted on the tongue. As the buckle is pivoted closed, it pulls on the cable and tightens both front ends of the upper around the hoof.

Such tensioning devices have been improved and perfected to provide variable degrees of tensioning and ranges of adjustment to fit different riding conditions and hoof sizes. However, fitting a boot to a particular hoof remains a challenge because of the variation in size and shape of horses' hooves. Even among horses wearing the same size boot (which is determined by the size of the footprint of the hoof), the shape of the hoof's top portion varies from horse to horse, requiring different degrees of tension to force the upper to adhere to the hoof's surface and firmly secure the boot on the hoof. Furthermore, tensioning devices are subjected to severe mechanical stresses during use, especially during hard riding conditions, and tend to brake. When that happens, the only recourse is a replacement boot, which may or may not be available when the failure occurs.

In order to avoid the complications associated with tensioning devices of prior horse boots, in U.S. Pat. No. 4,189,004 Glass described a simplified configuration of boot that can be affixed simply by screws penetrating the hoof on each side of the lateral walls of the boot. In the form of a slipper with a continuous upper without a rear cup or tongue, the boot is easily put on from the front by slipping it on until the front and side surfaces of the hoof butt against the interior of the boot's upper. The screws are then inserted into the sides of the hoof to secure the boot in place. Foam may be used to seal the edge of the upper around the hoof to keep debris out of the boot.

The screws of the Glass approach provide a simplified and more durable mechanism for securing a horse boot in place; however, it still requires a laborious procedure for putting the boot on and taking it off. In addition, the slipper configuration of the boot allows for a perfect fit when the upper matches well the shape of the hoof, but it does not allow the upper to deform to conform to the hoof when the two are not substantially the same, which is a common recurrence even for same size hooves. This drawback is underscored by Glass's use of foam to fill the cavities resulting from the fit.

In a separate copending application, the present inventor has disclosed a horse boot that is secured to the hoof of the horse only by bonding, without any additional restraining device. The boot is designed for a rapid and durable fit, and for maximum flexibility in conforming to the shape of the hoof. However, this boot cannot be easily removed to allow the horse to be naturally barefoot between workouts. Furthermore, water and moisture can build up inside the boot to cause softening of the hoof and produce several hoof conditions, such as thrush.

In view of the foregoing, the present invention provides a removable boot that combines the advantages of conventional strapped-on boots with those of glued-on boots.

SUMMARY OF THE INVENTION

The invention is a boot that comprises the combination of an inner liner and an outer shell. The liner is adapted to wrap around the lateral and front surfaces of the hoof of the horse, leaving the back side open. The shell includes a sole and an upper designed to conform with the exterior surface of the liner for attachment to it. The shell is fastened to the liner by some detachable means, such as nuts and bolts, and the liner/shell assembly is glued to the hoof. The upper has two backward sloping portions covering the sides and front of the hoof. A sufficiently deep slit both in the front of the liner and in the upper of the shell produce substantially independent side walls, so that maximum conformance to the shape of the hoof may be obtained when the boot is fitted and glued to the horse. The liner may be consist of two separate pieces. The upper also includes a short rear lip projecting backward at an approximate 45-degree angle to facilitate entry while still providing a ridge to enclose the back bottom portion of the hoof. All liner and upper constituents are sufficiently resilient to permit bending under hand pressure to fold them to conform to the shape of the hoof.

As a first step in fitting the boot, the liner and shell are combined and fastened to each other with fastening devices that permit their subsequent separation. For example, bolts threaded through appropriate grommets in the upper of the shell may be tightened to receiving nuts embedded in the liner. The boot is then fitted to the hoof of the horse from the front by sliding it into place until the hoof butts firmly against the front of the liner while keeping the two side walls open. Bonding material is placed between the side and front walls of the hoof and the interior surface of the liner, thereby securing the boot to the hoof. The entire fitting process may be carried out in a few minutes.

As a result of this boot configuration and method of installation, the shell of the boot of the invention may be readily removed, leaving the liner attached to the hoof of the horse. Thus, the horse is left essentially barefoot with the hoof bearing directly on the ground, as needed to enjoy the benefits of natural behavior. The shell can then be mounted again on the hoof by attaching it to the liner whenever boot protection is desired.

Additional features and advantages of the invention will be forthcoming from the following detailed description of certain specific embodiments when read in conjunction with the accompanying drawings.

DESCRIPTION OF THE PREFERRED EMBODIMENT

Figure 1:
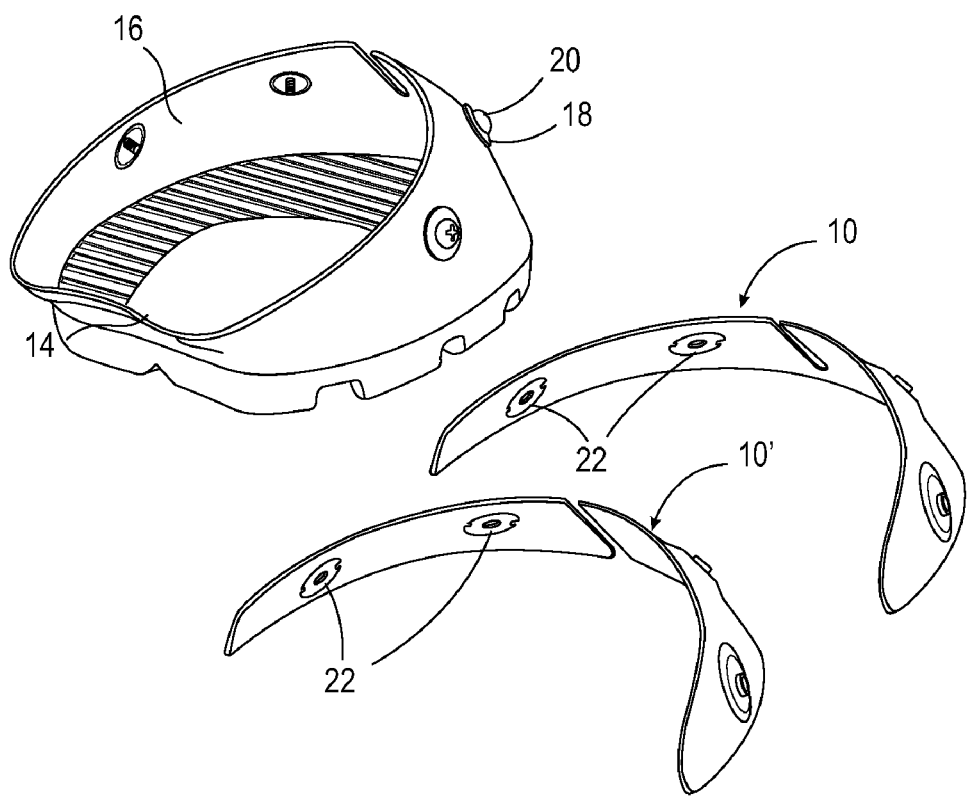
FIG. 1 is a picture showing in perspective view the inner liner (two embodiments) and the outer shell that constitute the boot of the invention.

Referring to FIG. 1, the two components of the boot of the invention are illustrated in perspective view. A glue-on inner liner 10 is combined with a shell 12 to form a boot on the hoof of a horse. The liner 10 preferably consists of a single piece of material shaped to conform to the side and front walls of the hoof of a horse. The liner has an open rear end for allowing its deformation and for wrapping easily around the hoof of the horse. The shell 12 consists of a sole 14 and a continuous upper 16 connected with a lower edge to the periphery of the sole 14. Both the liner 10 and the upper 16 include a front slit 30 (seen in FIG. 3) separating the respective right and left sides to allow them to resiliently fold in and out as necessary to conform better to the shape of the hoof wearing the boot without affecting the shape of the rest of the boot. Alternatively, the liner may comprise two separate pieces 10' for the left and right side of the hoof (that is, the front slit may be carried through to completely separate the two portions of the liner). This alternative form of liner constituents is also shown in FIG. 1

Figure 2:
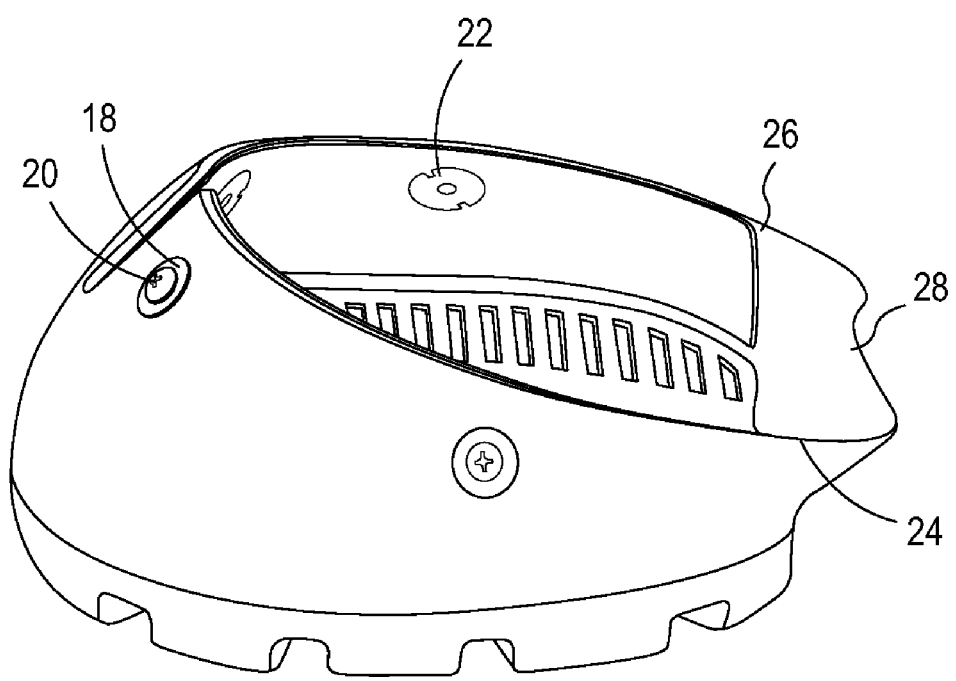
FIG. 2 is a perspective side view of the components of FIG. 1 after being combined and fastened to one another to produce the boot of the invention.
Figure 3:
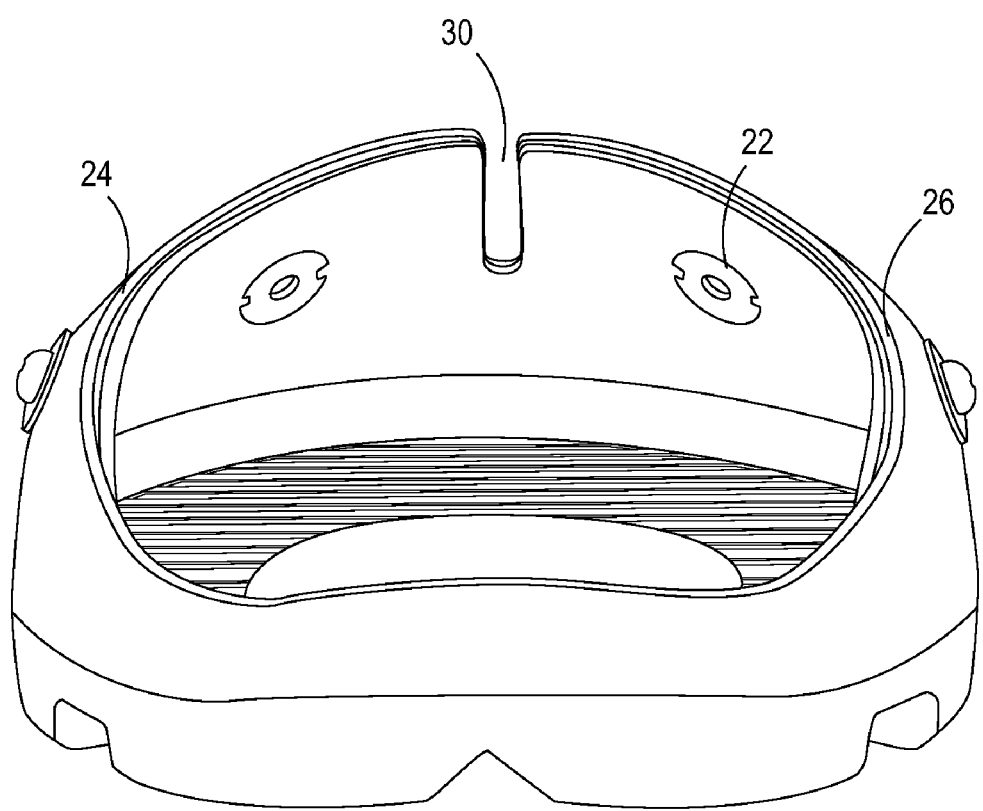
FIG. 3 is a perspective rear view of the boot of FIG. 2.

The upper 16 includes uniformly distributed grommets 18 (four being sufficient, for example) with respective bolts 20 for attaching the shell 12 to the liner 10 by means of receiving T-nuts 22 incorporated into the liner and aligned for easy engagement by the bolts 20 when the liner 10 is inserted into the shell 12. As also seen in FIGS. 2 and 3, the side walls 24,26 of the upper are formed so as to be normally folded inward to a degree sufficient to press against the liner for ease of assembly and to conform to the shape of the hoof to facilitate installation. Both the liner and the upper are made of a resilient material, such as polyurethane, so that the side walls may be opened by hand to permit insertion of the hoof into the assembled boot and also bent to conform to the hoof, as explained above.

The upper 14 preferably also includes a rear lip 28 that may be integral with the side walls 24,26. As seen clearly in FIG. 2, the rear lip 28 is sloped backward at an angle (roughly 45 degrees from vertical) deemed sufficiently wide to permit easy entry of the hoof into the boot without bending of the lip. For that same reason, the lip 28 is also shallow, only about an inch wide, which however is sufficient to provide a supporting anchor to the rear bottom of the hoof for a good fit of the boot. The top edges of the side walls 24,26 are preferably sloped downward toward the back to form a continuous top edge with the lip 28. Thus, the top edge of the upper runs continuously from the bottom of the front slit 30 through one side wall 24, the rear lip 28, the other side wall 26, and back to the bottom of the slit 30. While preferred, the rear lip 28 is not critical to the invention and can therefore be omitted from the design of the shell 12. In such case, the two side walls 24 and 26 are more distinctly separate, each covering one side and half the front side of the hoof, much the same way as the liner 10.

Figure 4:
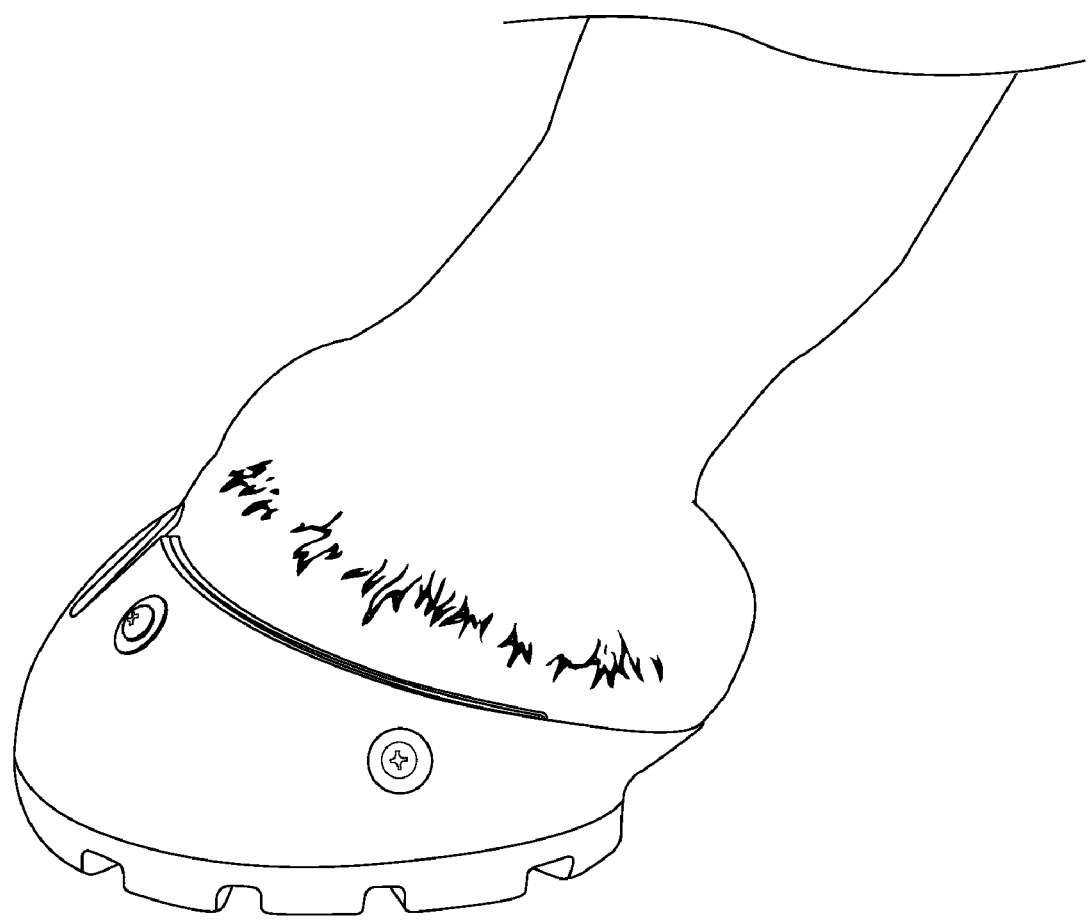
FIG. 4 is a perspective view of the boot of the invention after gluing to the side walls of the hoof of a horse.

In use, the invention requires that the liner and shell of the boot be first assembled to produce a boot, as seen in FIGS. 2 and 3, where the liner 10 constitutes essentially the inner surface of the boot intended to butt against the side walls of the hoof when the boot is installed. A coating of bonding material is spread over the inner surface of the liner or the side walls of the hoof, or both, and the assembled boot is mounted on the hoof. The boot is then kept firmly in place for the time required for the bonding material to set. Currently available polyurethane glues, such as the product marketed under the mark Sole-Guard by the Vettec Company of Oxnard, Calif., cure in less than 30 seconds. Therefore, the boot need not be held in place long before it is firmly attached to the hoof. The entire fitting process may be accomplished comfortably in less than two minutes. FIG. 4 illustrates the boot of the invention after the liner is bonded to the hoof of a horse.

Figure 5:
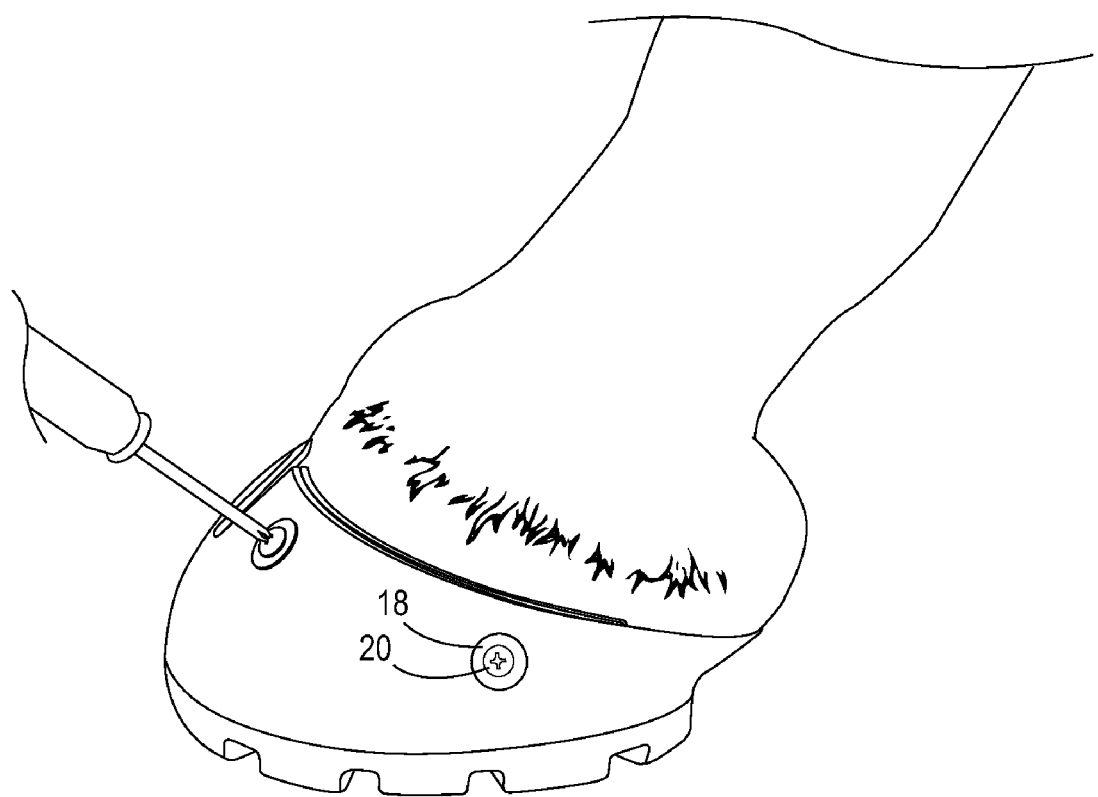
FIG. 5 shows a screwdriver being used to release the shell of the boot of the invention from the liner attached to the hoof of the horse.
Figure 6:
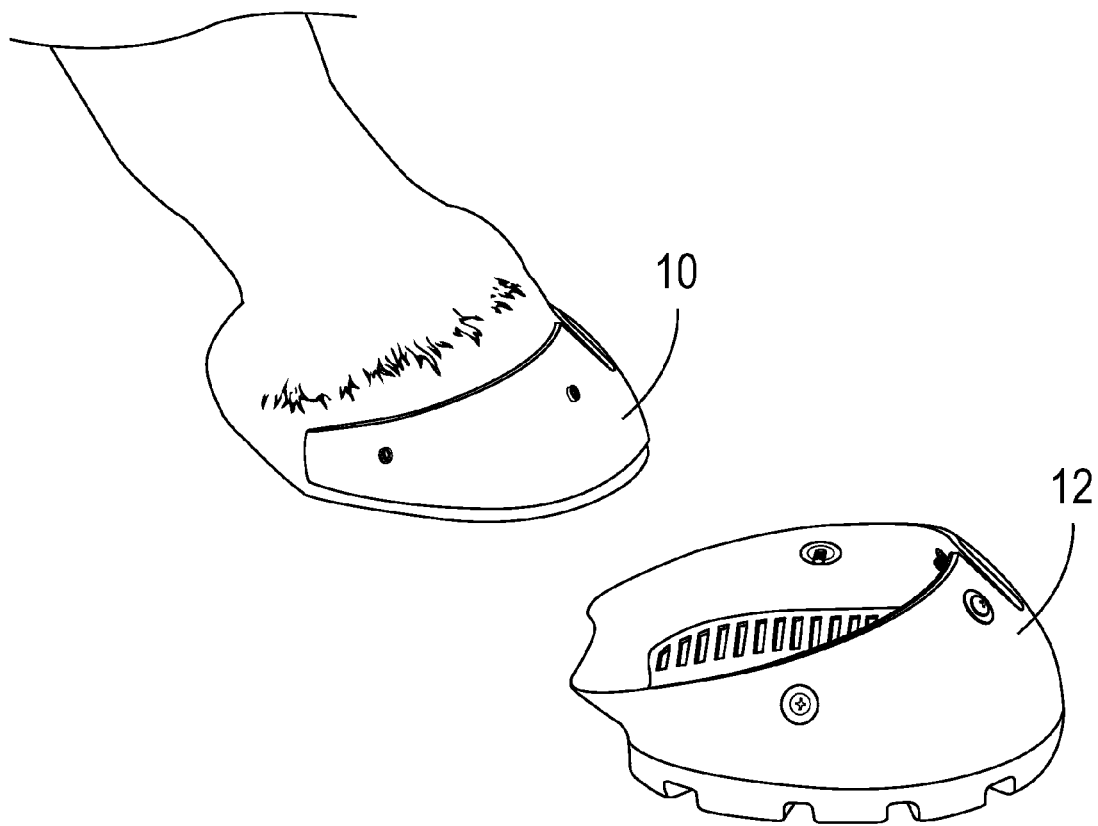
FIG. 6 shows the shell after removal from the liner that remains glued to the hoof of the horse.
Figure 7:
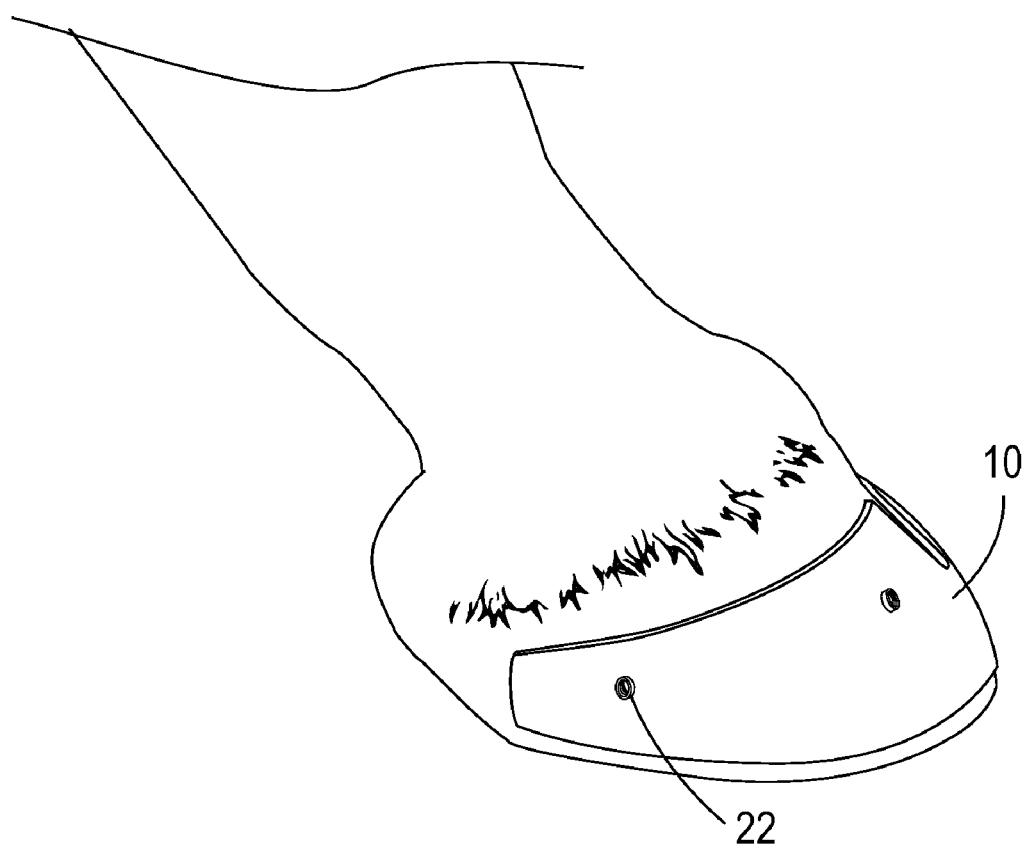
FIG. 7 is a perspective side view of the liner left on the hoof after removal of the boot's shell.
Figure 8A:
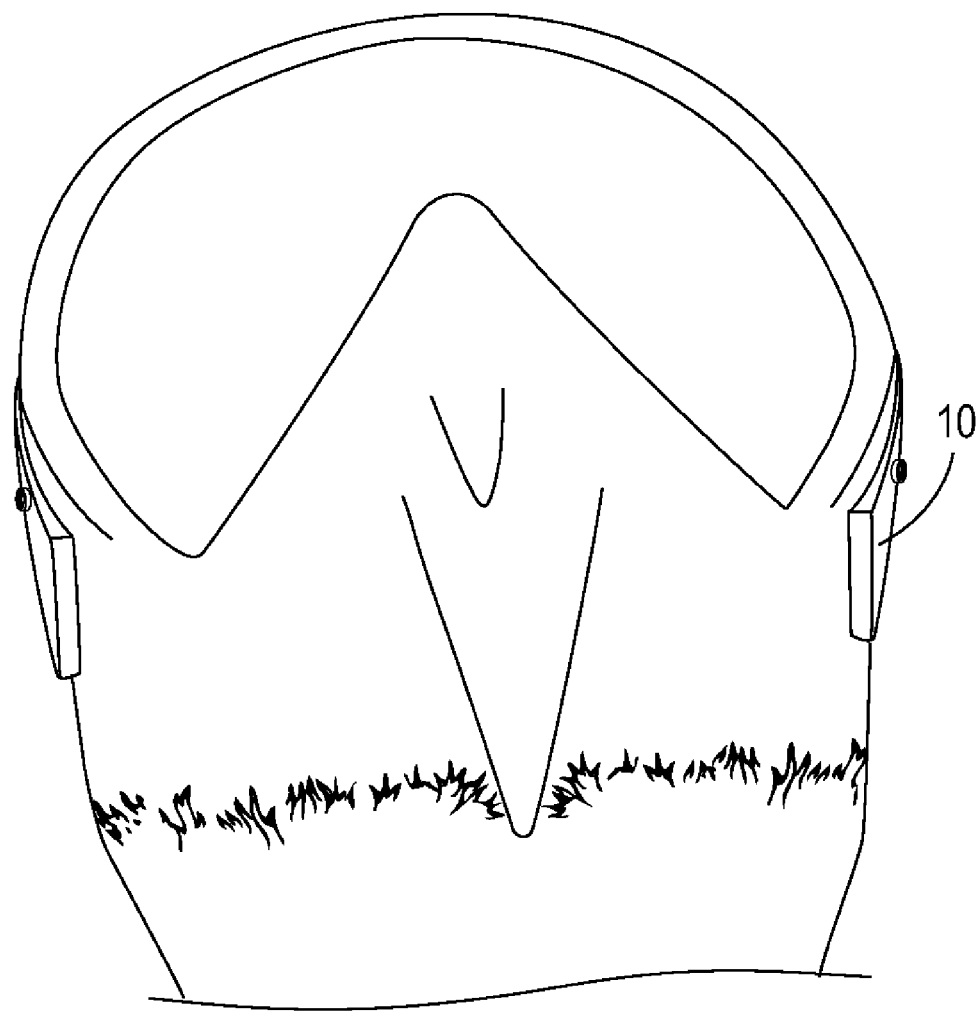
FIGS. 8A and B are perspective bottom views of the hoof of the horse showing the frog in its natural state and the liner of the invention still attached to the hoof.
Figure 8B:
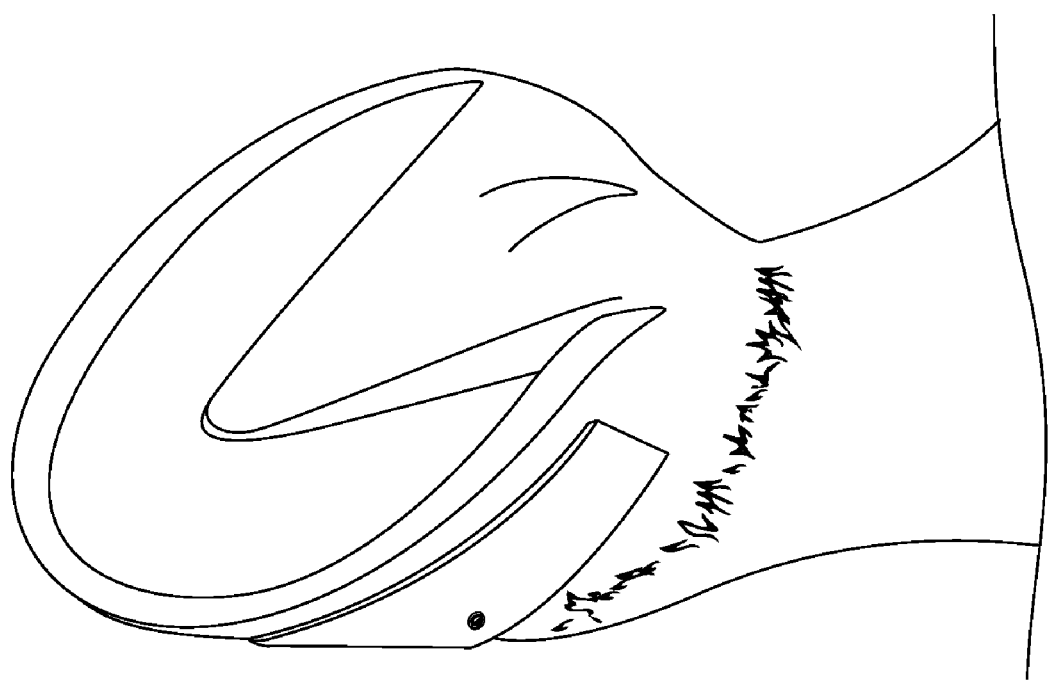
Figure 9:
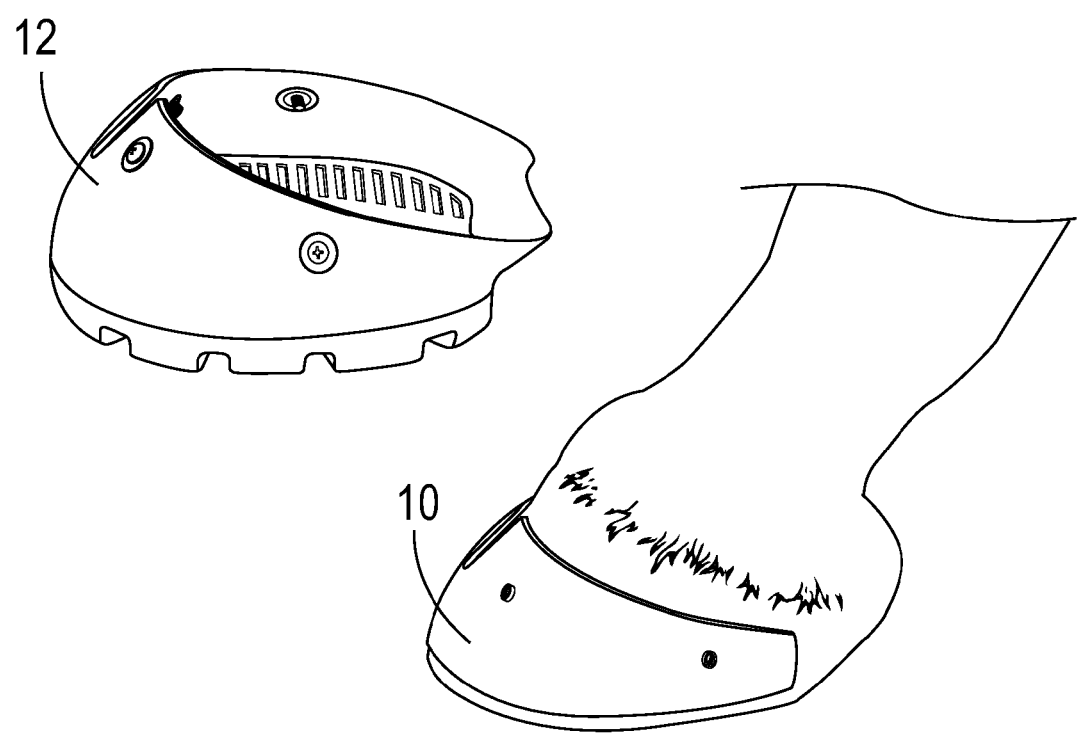
FIG. 9 illustrates the two components of the boot of the invention being prepared for reassembly of the boot on the hoof of the horse.
Figure 10A:
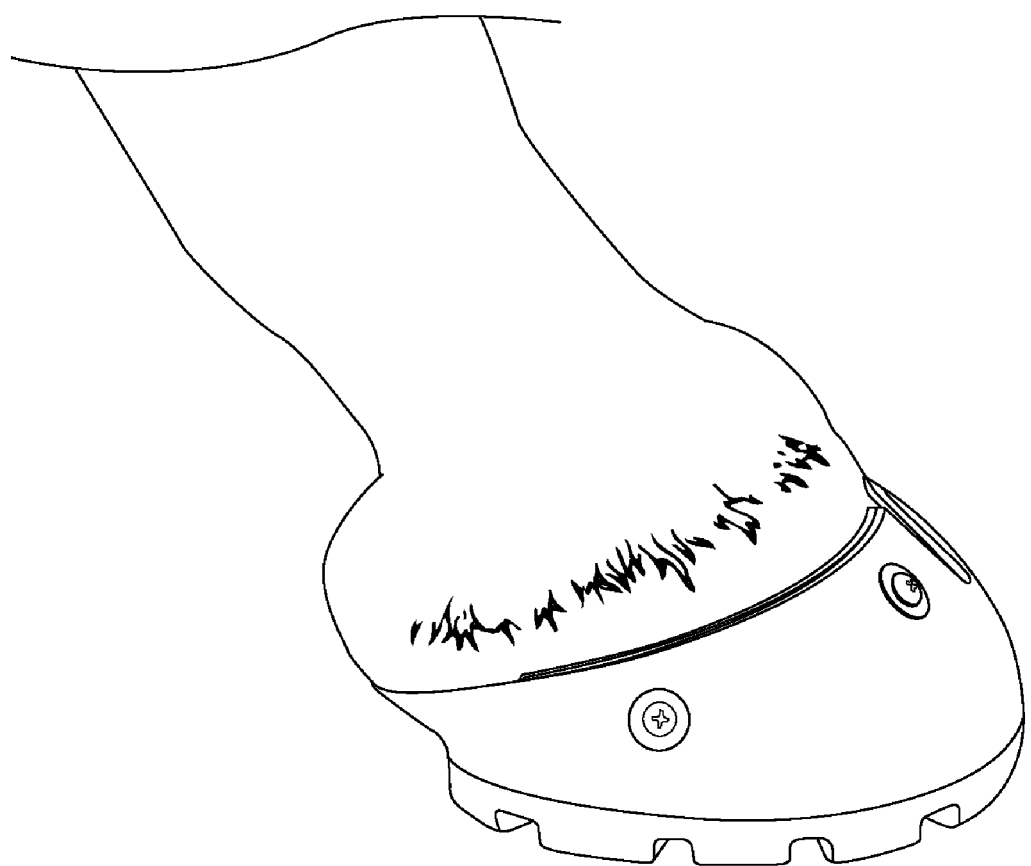
FIGS. 10A and B show the boot of the invention after reassembly on one hoof of the horse and the liner alone on another hoof for further illustration of the concept of the invention.
Figure 10B:
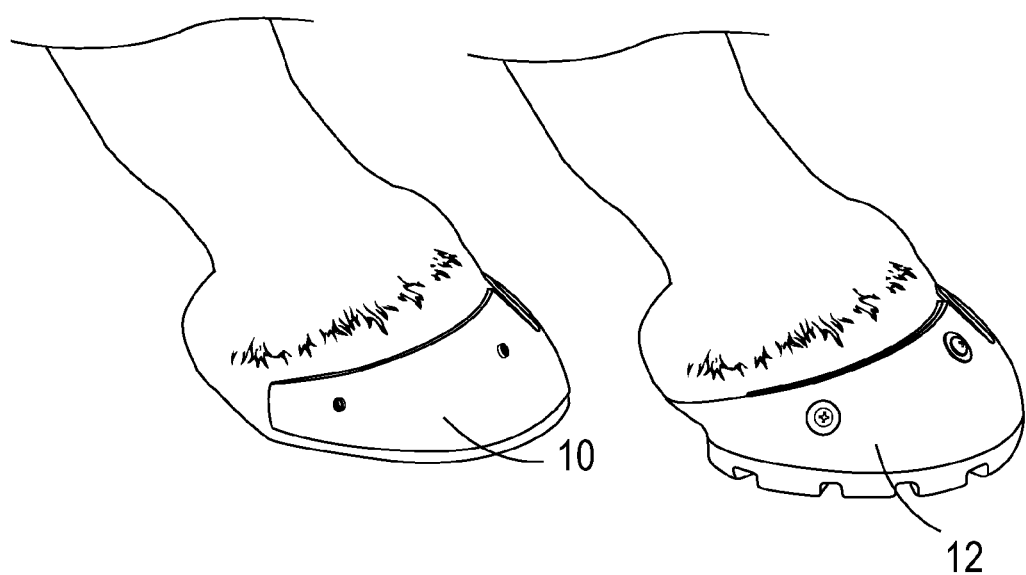

Because the shell 12 is removable from the liner 10, a user can easily disassemble the boot to free the hoof from the constraints of the boot. The simple operation of unscrewing the bolts 20 around the shell, as illustrated in FIG. 5, will readily allow the separation of the shell from the liner, which in turn will remain glued to the hoof for subsequent re-assembly of the boot. FIGS. 6-8 illustrate the product of disassembly of the boot of the invention, whereby the shell 12 of the boot is separated from the liner 10 uncovering the lower part of the hoof and leaving it essentially in a barefoot state. FIG. 7 illustrates the liner 10 that remains bonded to the side and front walls of the hoof. FIGS. 8A and B show the uncovered bottom of the hoof and frog, which are bounded laterally and in front by the liner 10 but are nonetheless free to expand and contract naturally because of the open ends of the liner. FIGS. 9 and 10A and B illustrate the re-assembly of the shell and the liner on the hoof for repeated use as a boot.

Using the Sole-Guard adhesive, the liner was bonded to a horse and the boot of the invention was used for a period of several weeks without failure until the glue began to give signs of separating from the hoof. At that point the liner was easily pried apart by pulling on the various portions of the upper. It appears that the normal aging and cell replacement of the hoof causes the outer layers of the hoof to separate from the bonding material without any damage to the hoof or the liner. In fact, the liner may be reattached simply by applying more glue for another period of use. This length of maintenance-free use is ideal for recreational riding as well as for endurance events during which it is particularly important to be able to ride without boot failures. Most importantly, this boot allows the horse to bear on its hooves in a natural state whenever the protection of a boot is not necessary.

While the invention has been shown and described herein with reference to what are believed to be the most practical embodiments, it is recognized that departures can be made within the scope of the invention. For example, the liner and shell make take different shapes and/or use different forms of fastening and/or include attachments for particular purposes, such as gaiters. For instance, compression fittings or hook and loop may be used instead of screws. Therefore, the invention is not to be limited to the details disclosed herein but is to be accorded the full scope of equivalent articles.

The invention claimed is:

1. A horse boot comprising:
   an inner liner shaped to conform to portions of side walls of a hoof of a horse;
   an outer shell including a sole and an upper; and
   a releasable fastening device connecting the outer shell to the inner liner;
   wherein the fastening device is connected to both the shell and the liner; and the liner is configured to bind to the side walls of the hoof of the horse, wherein the liner is entirely free of any contact with the ground and the hoof bears directly on the ground when the outer shell is removed.

2. The horse boot of claim 1, wherein said liner and upper of the outer shell include substantially overlaying slits at a position corresponding to a front portion of the hoof.

3. The horse boot of claim 1, wherein said liner comprises two pieces.

4. The horse boot of claim 1, wherein said fastening device includes nuts and bolts.

5. The horse boot of claim 1, wherein said upper of the outer shell includes a slit at a position corresponding to a front portion of the hoof, said liner comprises two pieces, and said fastening device includes nuts and bolts.

6. A horse boot kit comprising:
   an inner liner shaped to conform to portions of side walls of a hoof of a horse;
   an outer shell including a sole and an upper;
   a releasable fastening device connecting the outer shell to the inner liner; and
   a bonding material for attaching the inner liner to the side walls of the hoof of the horse;
   wherein the fastening device is connected to both the shell and the liner; and the liner is configured to bind to the side walls of the hoof of the horse, wherein the liner is entirely free of any contact with the ground and the hoof bears directly on the ground when the outer shell is removed.

7. The kit of claim 6, wherein said liner and upper of the outer shell include substantially overlaying slits at a position corresponding to a front portion of the hoof.

8. The kit of claim 6, wherein said liner comprises two pieces.

9. The kit of claim 6, wherein said fastening device includes nuts and bolts.

10. The horse boot of claim 6, wherein said upper of the outer shell includes a slit at a position corresponding to a front portion of the hoof, said liner comprises two pieces, and said fastening device includes nuts and bolts.

11. A method of protecting a horse's hoof with a horse boot comprising the following steps:
    providing an inner liner shaped to conform to portions of side walls of a hoof of a horse;
    providing an outer shell including a sole and an upper;
    releasable connecting the outer shell to the inner liner; and
    bonding the inner liner to the hoof of the horse;
    wherein the fastening device is connected to both the shell and the liner; and the liner is configured to bind to the side walls of the hoof of the horse, wherein the liner is entirely free of any contact with the ground and the hoof bears directly on the ground when the outer shell is removed.

12. The method of claim 11, further including the step of removing the outer shell from the inner liner bonded to the hoof of the horse.

13. The method of claim 12, further including the step of reconnecting the outer shell to the inner liner bonded to the hoof of the horse.

14. The method of claim 11, wherein said upper of the outer shell includes a slit at a position corresponding to a front portion of the hoof, said liner comprises two pieces, and said fastening device includes nuts and bolts.

15. The method of claim 14, further including the step of removing the outer shell from the inner liner bonded to the hoof of the horse.

16. The method of claim 15, further including the step of reconnecting the outer shell to the inner liner bonded to the hoof of the horse.

* * * * *